United States Patent

Roberts

[11] Patent Number: 6,031,647
[45] Date of Patent: Feb. 29, 2000

[54] STABLE POWER CONTROL FOR OPTICAL TRANSMISSION SYSTEMS

[75] Inventor: Kim Byron Roberts, Welwyn Garden City, Canada

[73] Assignee: Nortel Networks Corporation, Richardson, Tex.

[21] Appl. No.: 08/735,759

[22] Filed: Oct. 23, 1996

[51] Int. Cl.[7] .................................................. H04J 14/02
[52] U.S. Cl. ...................... 359/161; 359/124; 359/132; 359/133
[58] Field of Search .................................. 359/161, 177, 359/187, 194, 124, 132, 133, 134

[56] References Cited

U.S. PATENT DOCUMENTS

| | | | |
|---|---|---|---|
| 5,088,095 | 2/1992 | Zirngibl | 372/6 |
| 5,225,922 | 7/1993 | Chraplyvy | 359/161 |
| 5,276,543 | 1/1994 | Olshansky | 359/161 |
| 5,396,360 | 3/1995 | Majima | 359/176 |
| 5,475,521 | 12/1995 | Heidemann | 359/177 |
| 5,500,756 | 3/1996 | Tsushima et al. | 359/177 |
| 5,510,926 | 4/1996 | Bayart et al. | 359/179 |
| 5,532,861 | 7/1996 | Pirio et al. | 359/161 |
| 5,623,355 | 4/1997 | Olsen | 359/161 |
| 5,646,763 | 7/1997 | Misaizu et al. | 359/187 |
| 5,675,432 | 10/1997 | Kosaka | 359/177 |
| 5,703,711 | 12/1997 | Hamada | 359/177 |
| 5,739,938 | 4/1998 | Goutzoulis et al. | 359/187 |
| 5,745,275 | 4/1998 | Giles | 359/187 |
| 5,764,404 | 6/1998 | Yamane et al. | 359/124 |
| 5,768,011 | 6/1998 | Amaki | 359/177 |
| 5,864,422 | 1/1999 | Miyazaki et al. | 359/341 |
| 5,870,217 | 2/1999 | Itou | 359/179 |

OTHER PUBLICATIONS

Journal of Lightwave Technology vol. 13, No. 5, May 1995 p. 782–790 by Goldstein et al.
"Optical Element Power Control" U.S. Patent Application #715662 by same inventor, (K.B. Roberts) of ref Roberts 14.

*Primary Examiner*—Leslie Pascal
*Attorney, Agent, or Firm*—John D. Crane

[57] ABSTRACT

In an optical transmission system, an optical signal is transmitted to an optical element which is sensitive to changes in the optical power of the signal. Changes in optical power are anticipated and damped by controlling the transmitter output power, or an external damping element. For WDM systems, wavelengths can be added or removed without causing rapid changes in total power which would otherwise disturb the output of downstream optical amplifiers, and cause bit errors.

5 Claims, 7 Drawing Sheets

STABLE POWER CONTROL FOR OPTICAL TRANSMISSION SYSTEMS

FIELD OF THE INVENTION

The present invention relates to methods of operating optical transmission systems, to methods of controlling transmitters, to methods of controlling an optical power damping element, to optical transmission systems, to transmitters, and to damping systems.

BACKGROUND TO THE INVENTION

The power level of an optical signal in an optical transmission system limits the distance between regenerators or amplifiers, and needs to be controlled carefully to avoid errors in the detected bits.

A signal with too high an optical power is subject to nonlinear effects in the fibre such as Self-Phase-Modulation that can seriously degrade the signal. This causes bit errors or loss of frame in the signal. These nonlinear effects are especially severe at bit rates at and above 10 Gb/s. The onset of the nonlinear degradations can be quite sharp, in that only one or two dB of increase in power level can push a signal from optimum performance to a failed state.

A signal with too low an optical power is subject to noise degradations after attenuation by the optical link.

Erbium Doped Fibre Amplifiers can cause amplitude transients when amplifying several wavelengths at once. Consider the simple example of two wavelengths. If one wavelength is removed while the pump power remains constant, then the output power at the other wavelength will increase by 3 dB. The speed of this transient is determined by the pump power and by the response of the erbium doped fibre, and is measured in microseconds.

Addition of a second wavelength causes a similar 3 dB drop in the output power of the first wavelength present.

In a wavelength division multiplex system new wavelengths commonly need to be added to systems that are in service. This may be due to an upgrade or may be caused by replacing a unit. Wavelengths also need to be removed when replacing a unit or reconfiguring the system.

Rapid changes in the power of an optical signal at one wavelength can move another signal away from its optimum power level towards too high or too low a power. Power margin must be allocated in the design of the optical system so that during a worst case transient, when combined with other worst case conditions, the data remains error free.

Allowing this margin reduces the available performance of the system, for example, reducing the maximum allowed amplifier spacings.

Various optical elements are sensitive to power changes, including receivers. Even if remaining within an appropriate static power range, rapid power transients can still cause bit errors. For example if the transient is faster than the response rate of automatic gain control in a receiver then the receiver electronics could be momentarily overloaded. These distortions can cause errors. During a transient the electrical signal, at the decision comparator will be larger or smaller than anticipated. The eye between logic levels will move, which places the decision threshold at the wrong location in the eye which causes bit errors.

Furthermore, amplitude transients can cause phase transients in clock recovery circuits that can exceed allowable jitter ranges, even to the extent of causing bit errors.

It is important that the signals carried by the wavelengths other than those being added or deleted remain error free.

It is known from U.S. Pat. No. 5,088,095 (AT & T) that gain clamping by out-of-band lasing in an optical amplifier can improve further the response to power transients in that amplifier. However, this requires a lot more pump power than a normal amplifier which is expensive to provide.

It is also acknowledged in U.S. Pat. No. 5,088,095 (AT & T) that it was known to stabilise amplifier output by detecting power changes at an amplifier input, and induce opposing compensatory changes in the pump power control circuitry.

Cooling an optical amplifier in liquid nitrogen has been shown in Journal of lightwave technology vol. 13, No 5, May 1995, pages 782–790 "Inhomogenously Broadened Fibre-Amplifier Cascades for Transparent Multiwavelength Lightwave Networks" by Goldstein et al, to allow separate saturation of the different wavelengths and so suppresses crosstalk of the power transient between wavelengths. However this is not practical for field equipment.

These three methods attempt to eliminate or minimise the transient effect of one channel on another in an optical amplified system, by improved gain control, once the transient reaches the sensitive element.

SUMMARY OF THE INVENTION

The invention aims to improve on such methods. According to a first aspect of the invention there is provided a method of operating an optical transmission system, comprising the steps of: transmitting at least one optical signal to an optical element which is sensitive to changes in the optical power of the signal; determining that the optical power is going to change; and damping the change in the signal input to the element, in response to the determination.

In contrast to the conventional methods, by determining that the optical power is going to change, and damping the change, the system performance can be improved, and power margins reduced, since power changes are suppressed before they reach the sensitive elements.

Advantageously, an instruction to change the power level is intercepted. This enables the instructed change to take place gradually, to reduce the disturbance which may be caused by the change.

Advantageously the determination of change is carried out by measuring the optical power, and extrapolating from the measurement. This enables unforeseen changes to be damped before they cause disturbances.

Advantageously the optical signal comprises a plurality of wavelengths and the damping step involves damping of one or more wavelengths individually. This enables the total power to be maintained without disturbing changes. Notably, optical amplifiers are sensitive to changes in total power. Advantageously a power change in one wavelength band is determined, and the damping step comprises the step of damping the change in total power by applying a gradually reducing compensating change to the power level of at least one other of the wavelength bands. This means the compensating change, which may be rapid, can be divided across a number of wavelengths, or that a dummy wavelength band can be used purely for the purpose of maintaining a stable overall power.

Advantageously the damping step involves controlling the output power of an optical source of the optical signal. This means existing control circuitry can be used with little modification.

Advantageously the method further comprises the step of controlling an output power of the optical source using a control loop with a predetermined maximum rate of change, wherein in the damping step is carried out with a lower rate of change.

Advantageously the optical element is an optical amplifier and the method further comprises the step of controlling the amplifier power output in response to the power in a subset of the wavelength bands. This enables the power margins to be reduced further.

Advantageously the method comprises the step of determining a desired rate of damping, according to the amount of change and a desired time to complete the change. This enables the rate of damping to be controlled to suit the circumstances.

Advantageously the damping step comprises the step of controlling the power level of a stabilising optical signal, to compensate for the change.

According to another aspect of the invention, there is provided a method of controlling a transmitter of an optical transmission system comprising the steps of: determining when an instruction to change an output power of the transmitter has been received; and changing the output power according to the instruction, at a rate slower than a usual response rate of the transmitter. This enables undesirable rapid changes to the damped.

According to another aspect of the invention, there is provided a method of controlling an optical power damping element in an optical transmission system comprising the steps of: determining when there is an optical power change at the input to the element; and damping the change by allowing the output of the element to make a corresponding change, but at a slower rate. This enables rapid changes in power already transmitted, to be damped.

According to another aspect of the invention, there is provided an optical transmission system comprising: means for transmitting an optical signal; an optical element which is sensitive to changes in the optical power of the signal; means for determining that the optical power is going to change; and means for damping the change in the signal input to the element, responsive to the means for determining the change.

According to another aspect of the invention, there is provided a transmitter for an optical transmission system, comprising: means for determining when an instruction to change an output power of the transmitter has been received; means for converting the instruction to an instruction to change the output power of the transmitter at a rate slower than a usual response rate of the transmitter.

According to another aspect of the invention, there is provided a damping system for an optical transmission system comprising: means for determining an optical power change at the input to a controllable element; and means for controlling an output of the element to allow a corresponding change at the output, but at a slower rate.

According to a last aspect of the invention, there is provided a method of operating a multiplexed optical transmission system for transmitting a plurality of optical signals, and comprising an element sensitive to changes in optical power, the method comprising the steps of introducing a stabilising signal into the optical path upstream of the element; and controlling the power of the stabilising signal to compensate for changes in power levels of at least some of the other signals transmitted.

This can be carried out with or without damping, and can enable a reduction in transients and a constant overall power to be achieved.

Advantageously, the stabilising signal is used to carry information. This improves the overall bandwidth over the case where the stabilising signal is a dummy.

Advantageously such information is carried at a lower rate, which may allow the receiver to cope with greater power transients. Alternatively, or as well, the information may be carried at a lower rate, or with greater redundancy, to enable improved error handling.

It will be apparent to a skilled person that the advantageous features can be combined with each other and with any aspect of the invention as desired.

BRIEF DESCRIPTION OF THE DRAWINGS

For a better understanding of the invention, and to show how the same may be carried into effect, examples of the invention will now be described with reference to the drawings, in which.

DETAILED DESCRIPTION

Figure 1:
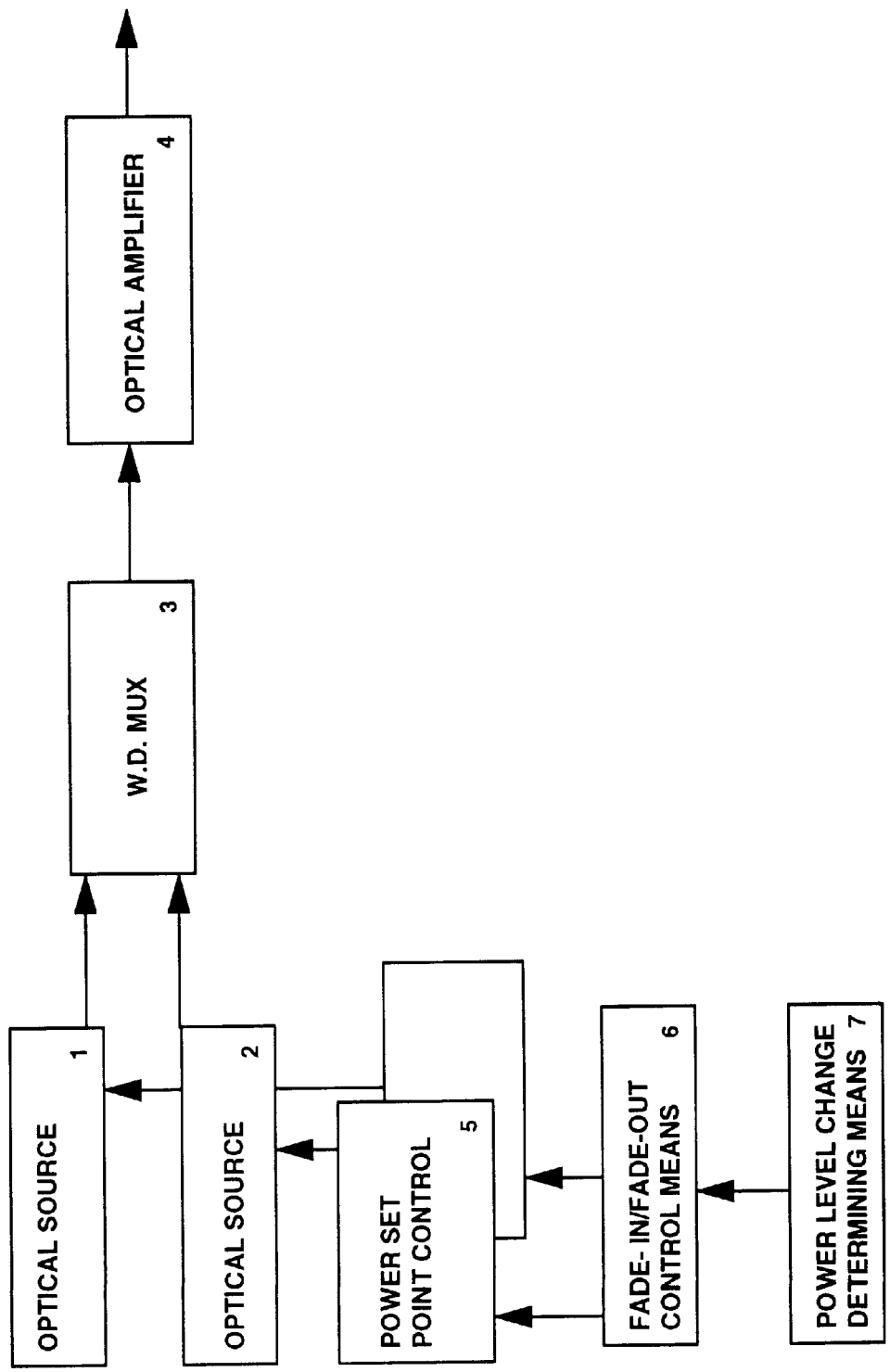
FIG. 1 shows an embodiment of the invention in schematic form.

FIG. 1 shows an optical transmission system including optical sources 1, 2, a wavelength division multiplexer 3, and an optical amplifier 4. Normally, the optical amplifier would be needed at a distance of tens or hundreds of kilometers down the link, to overcome the attenuation caused by optical fibre making up the optical path. Numerous amplifiers may be incorporated, according to the distance covered by the transmission system, between the source 1,2 and a receiver (not shown). In principle, the invention can be applied to systems using a single wavelength band, or using other types of multiplexing such as polarisation multiplexing or time division multiplexing.

FIG. 1 also illustrates a power set point control means 5, provided for each of the optical sources (normally lasers). A fade-in/fade-out control means 6 is illustrated, feeding the power set point control means. The fade-in/fade-out control means is operable in response to a power level change determining means 7.

In practice, the functions of the set point control 5, the control means 6 and the determining means 7 may be carried out within a conventional micro controller. The fade-in/fade-out control means may be operable to gradually vary the set point for the output power of one of the optical sources, according to an external stimulus.

This external stimulus may take the form of an instruction to switch off one of the optical sources, eg for maintenance or reconfiguration. In this case, a sudden switch off might produce sufficient change in the total optical power, to disturb the optical amplifier, and cause bit errors. Accordingly, the micro controller, controlling either or both of the optical sources would gradually reduce the set point for the output power of the appropriate optical source.

The stimulus for a change could also come from other sources, such as alarm signals indicating that a particular optical source may be at some risk of failing. The stimulus could also come from detectors which indicate that maintenance personnel are beginning to extract a card containing an optical source, for maintenance or replacement.

In these later two cases, it might be appropriate for the rate of change of the power set point to be relatively rapid, for example one or two seconds, to ensure that the fade out is complete before the optical source fails, or is disconnected.

Otherwise, the fade-out could be extended over the course of around 60 seconds, to allow automatic gain control circuits to adjust the pump power of the optical amplifier for example, and thus minimise the likelihood of bit errors.

A gradual fade in of the set point of the output power can be initiated in a corresponding way. For example, when it is detected that the optical source has been re-connected, or when alarms have switched off, or when an instruction to add a wavelength is given.

Figure 2:
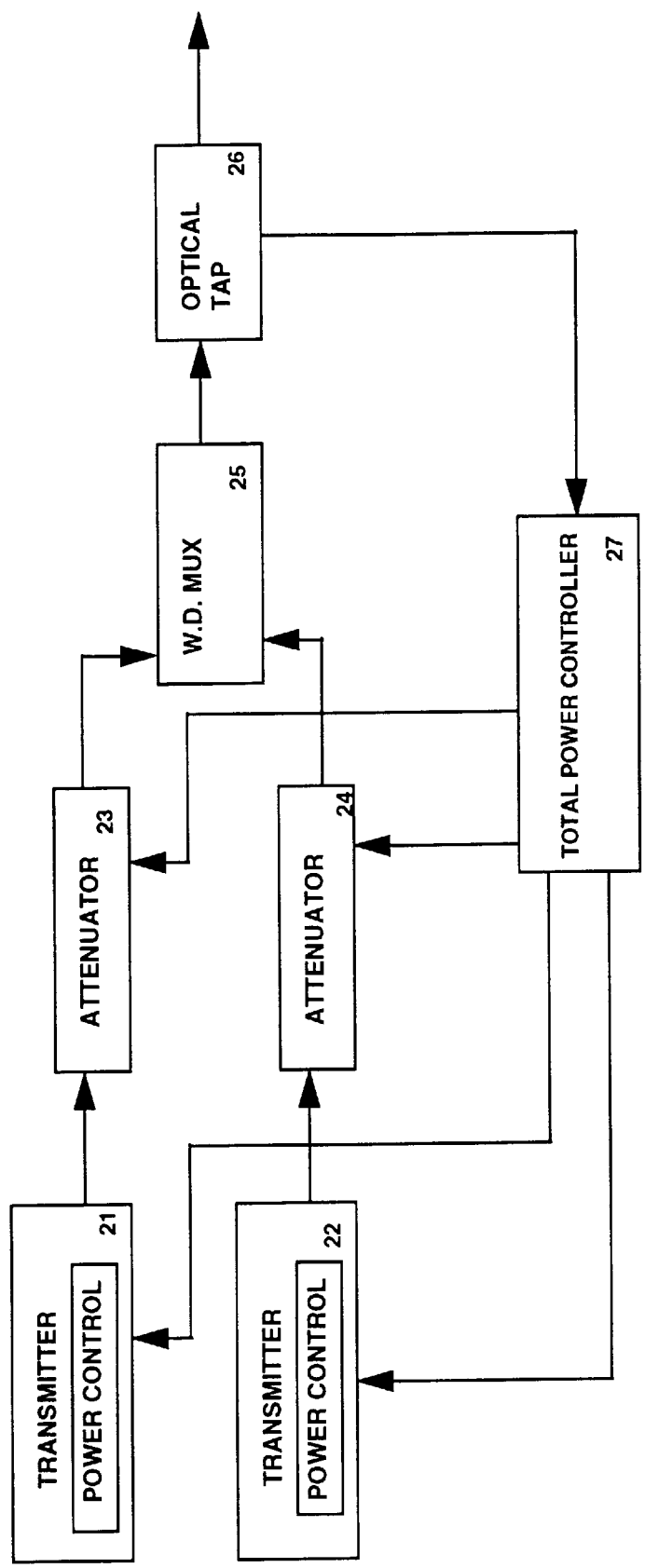
FIG. 2 shows an alternative embodiment of the invention in schematic form.

FIG. 2 shows an alternative embodiment. Transmitters 21 and 22 include power control functions. The optical output of the transmitters are passed to attenuators 23, 24 before being passed to a wavelength division multiplexing function 25. A total power controller 27 is fed by the optical tap 26. To maintain the total optical power at a stable level, the total power controller controls the attenuators 23, 24, and/or the individual output power controllers for the transmitters 21, 22. The total power controller, and the individual transmitter power controls may be implemented using a conventional micro controller. The attenuators 23, 24 may act as damping elements, to damp any change in output power. Accordingly, prior to switch on of a transmitter, an attenuator could be controlled to pass virtually nothing. After switch on of the transmitter, the attenuator could be gradually controlled so as to allow a gradual increase in signal output power. Correspondingly, if a transmitter is to be switched off, prior to the switch off, the attenuator 23 could be controlled so as to gradually reduce the output signal power.

Furthermore, compensation for transmitter 21 having its power level changed, could be carried out by controlling the attenuator 24, associated with a different wavelength. For example, when transmitter 21 is to be switched on, attenuator 24 could be controlled so as to reduce the power output of the signal originated from the other transmitter, transmitter 22. This illustrates how the last aspect of the invention could be implemented, without necessarily determining that a power change is going to happen, and without necessarily damping the change. The compensation is carried out using one or more of the wavelength bands as a stabilising signal. Clearly it is not essential to use attenuators to control the power of the stabilising signal. For example, the output power of the laser could be controlled as will be described below.

Of course, although only two transmitters are shown in FIG. 2 and only two optical sources are shown in FIG. 1, there could be many more, and similar principles of operation would apply.

Figure 3:
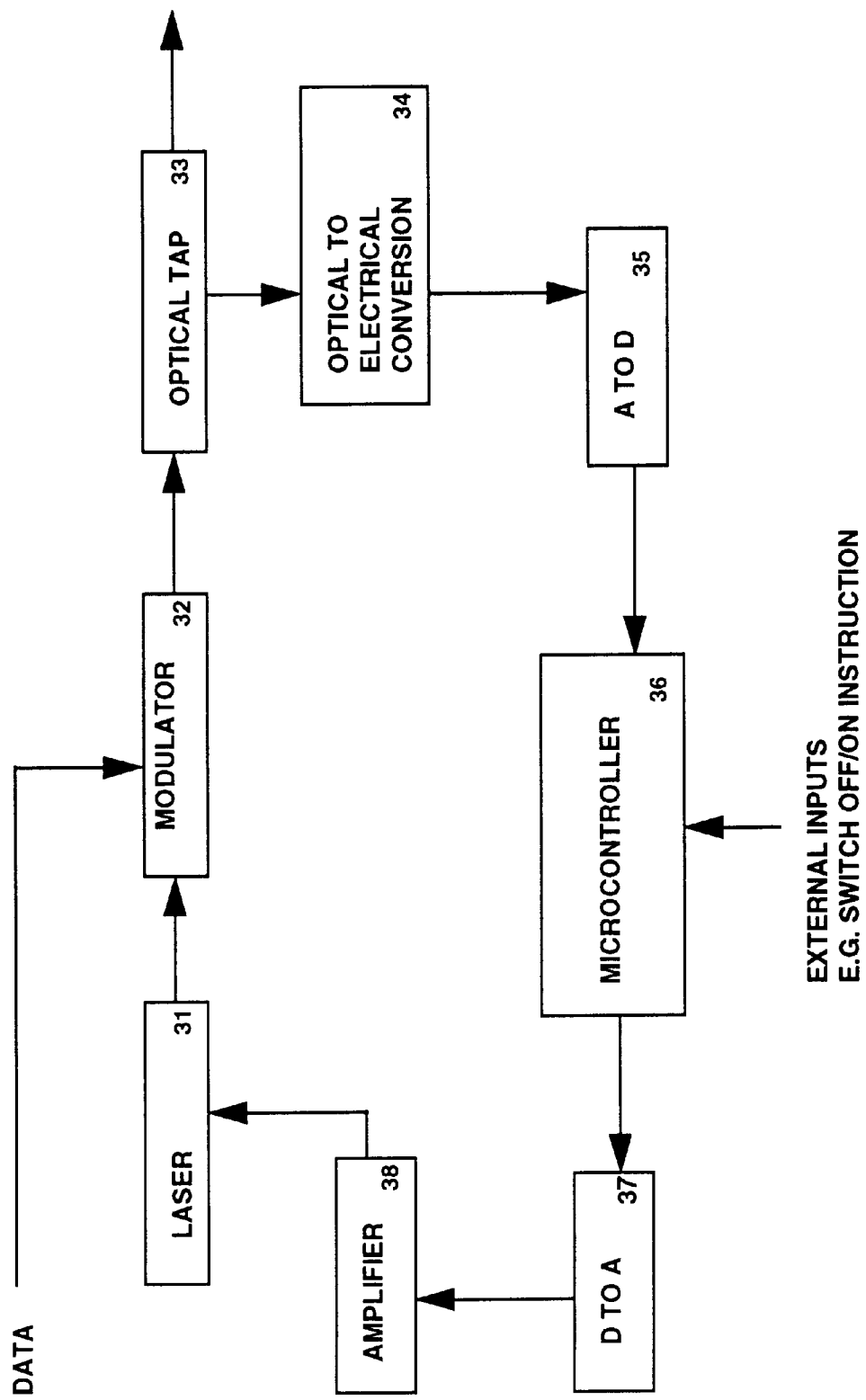
FIG. 3 shows a transmitter of FIG. 2 in more detail, in schematic form.

FIG. 3 shows in schematic form the principal hardware elements involved in controlling the output power of a laser. A laser 31 feeds an external modulator 32, whose output is fed via a optical tap 33. A small proportion of the optical signal is fed back via an optical to electrical conversion stage 34 (usually a P.I.N. diode). Amplification usually follows, before a A to D converter 35 which feeds the micro controller 36. This provides the micro controller with values corresponding to the output power of the laser. The power values may be updated at a rate of tens of kHz, or hundreds of KHz. The micro controller, operating at a clock rate of several MHz, or tens of MHz can carry out control algorithms to adjust the output power of the laser, by controlling its bias current. A digital to analogue converter 37 converts the output of the micro controller into analogue form, for amplification by an amplifier 38. The micro controller 36 may have other inputs, to received instructions from another overall controller, controlling a number of lasers, for example operating at different wavelengths, feeding a multiplexing device in a W.D.M (Wavelength Division Multiplex) system. Furthermore, the micro controller may receive inputs from mechanical sensors indicating if the transmitter is being disconnected or dismantled, and it may receive inputs from alarm signals generated on the same card, from other hardware elements shown in FIG. 3, or from other parts of the optical transmission system, even those at remote locations.

Figure 4:
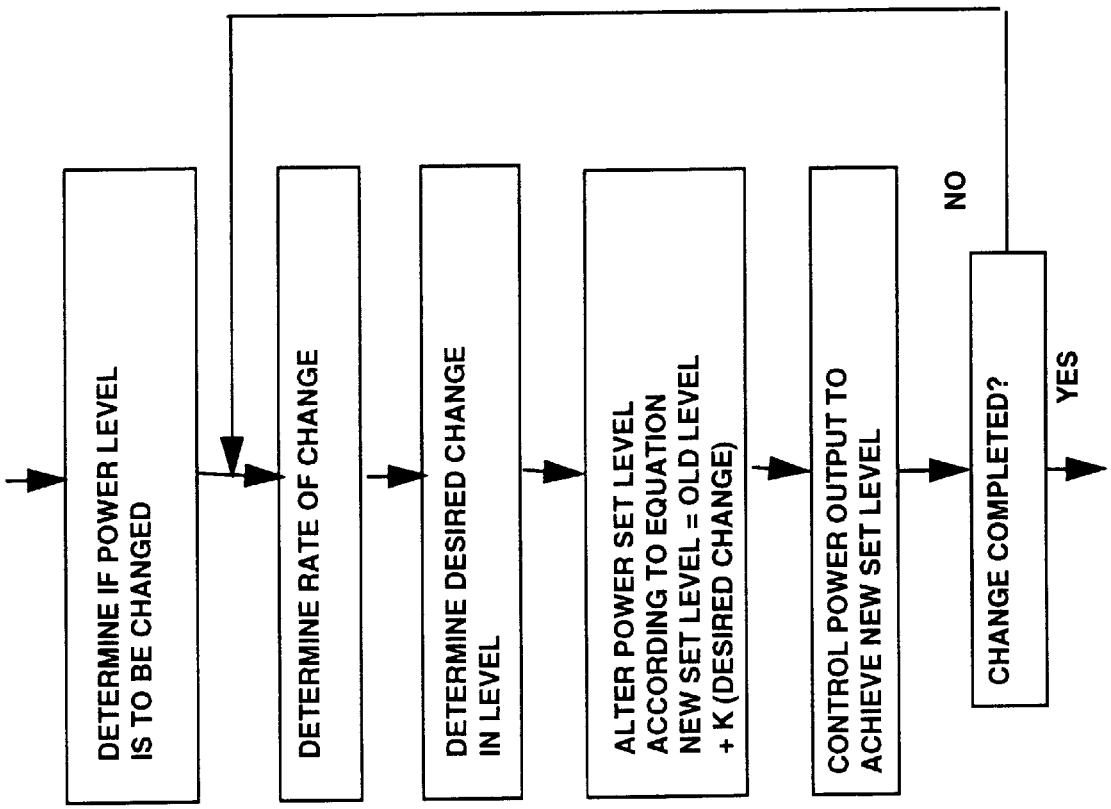
FIG. 4 shows a flow diagram of a power control method according to the invention.

FIG. 4 shows a flow diagram showing some of the control steps to be carried out by the micro controller of FIG. 3, or by a corresponding controller for a damping element such as the attenuator shown in FIG. 2.

The first step involves determining if the output power level is to be changed. As discussed, this can involve checking various inputs to the micro controller. Next, the amount of the total change in level may be determined. This step may be unnecessary, if the output is simply to follow the input but at a different rate of change. The amount of desired change may nevertheless be useful in the next step, of determining the rate of change. This may involve checking inputs to the micro controller, to see if there is an urgent alarm, which might merit a more rapid rate of change than a normal switch on/switch off situation. From the rate of change, the amount of change for the current cycle can be determined. The loop gain K is set to achieve the desired rate of change.

The next step is to alter the power level output by the transmitter, by first of all altering the set level, at a desired rate. A control loop then tries to achieve the new set level. The timing of this control loop should be set so that it runs at least ten times as fast as the loop controlling the power set level, so that phase changes in one loop do not affect the other loop.

The loop back to change the set level again may be exited after a given time or a given number of iterations, or, as shown in FIG. 4 by ascertaining that the change has been completed.

Figure 5:
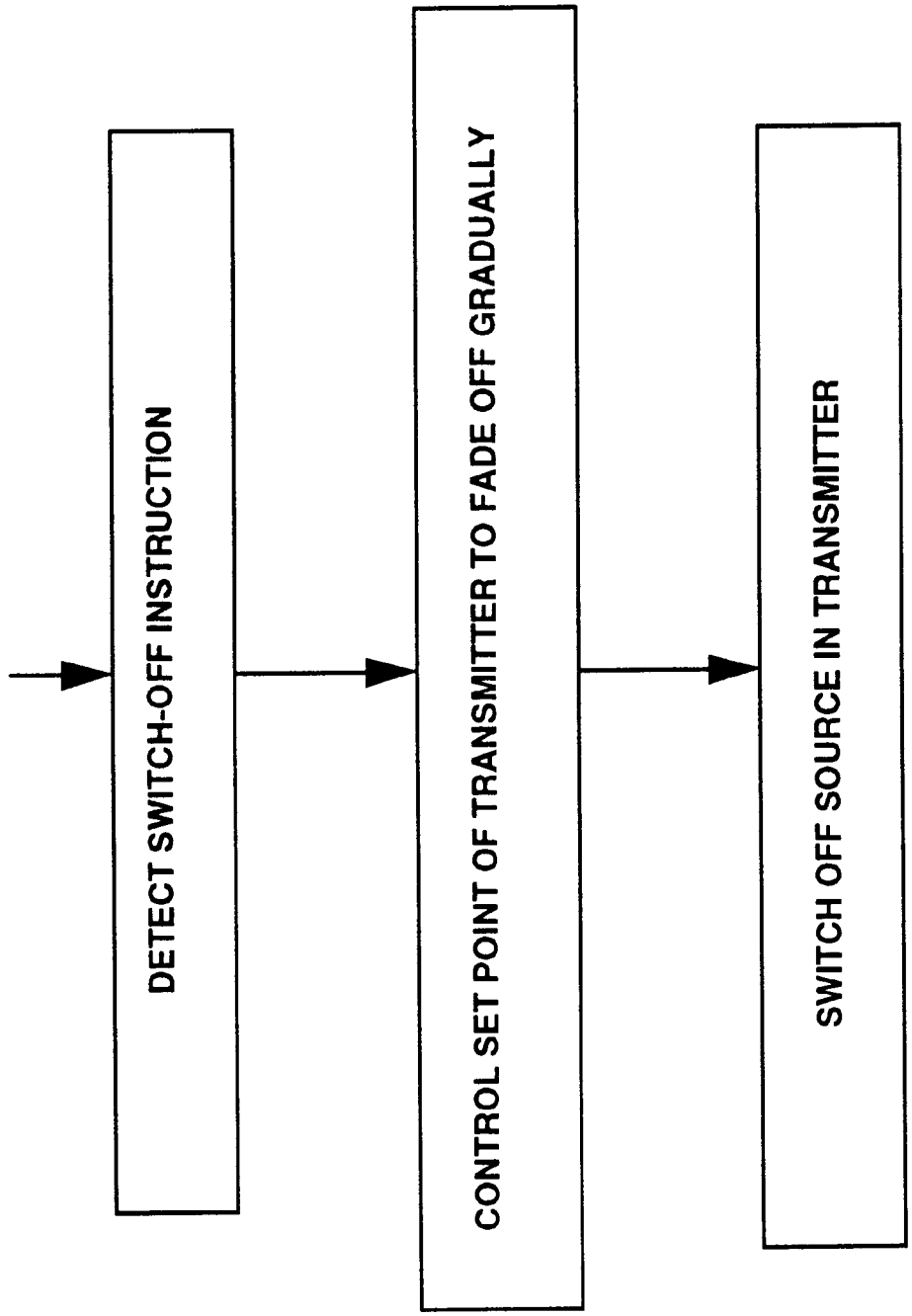
FIG. 5 shows another example of a power control method according to the invention.

FIG. 5 shows in schematic form the particular example of how the micro controller may react to a switch-off instruction. After detecting such an instruction, the set point of the transmitter can be controlled to fade off gradually, as shown in FIG. 4. Finally, the optical source in the transmitter can be switched off.

Figure 6:
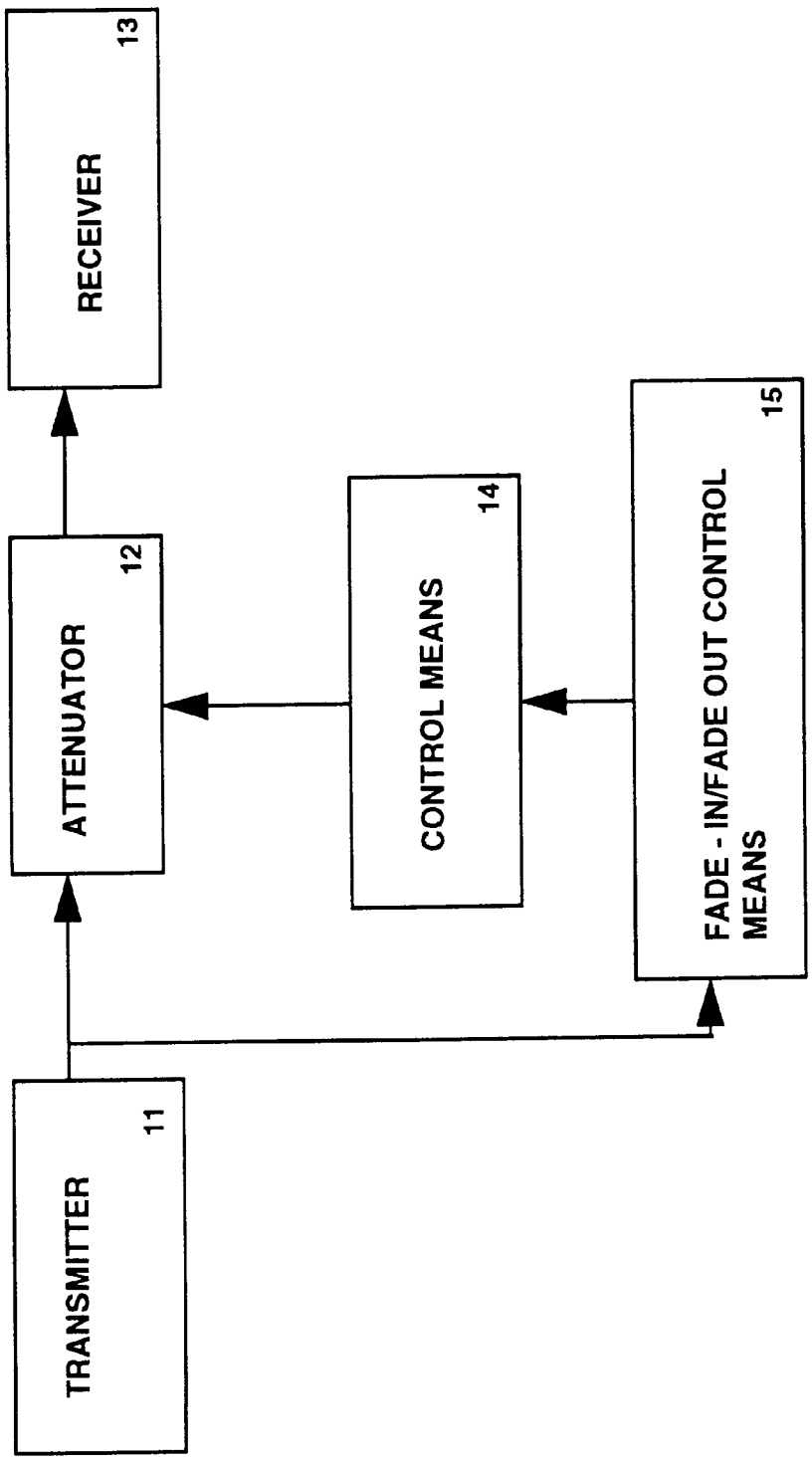
FIG. 6 shows another optical transmission system showing features of the invention.

FIG. 6 shows an optical transmission system including a transmitter 11, an attenuator 12, and a receiver 13. The attenuator 12 is controlled by a control means 14. The control means 14 is operable in response to a fade-in/fade-out control means 15. The fade-in/fade-out control means is itself operable according to the optical signal power level detected at the input to the attenuator 12, or the output of the transmitter 11. The attenuator 12 or an equivalent damping element, may be located anywhere in the optical link, before an optical element which is sensitive to power changes, such as the receiver 13, or an optical amplifier. Electrically controllable attenuators using faraday rotation might be suitable and have been announced recently by Fujitsu.

The control means 14, and the fade-in/fade-out control means 15 can be implemented by a conventional micro controller, and associated circuitry as described above.

Although not illustrated, the attenuator could be controlled additionally on the basis of a intercepted instruction to the transmitter to change the power level. Conceivably the fade-in/fade-out control means could be operable in response to the signal power measured at the output of the attenuator, as well, or instead of the power measured at the input to the attenuator. The response time of the control means 14 and the fade-in/fade-out control means 15 will be finite, and therefore the attenuator may be unable to completely damp extremely rapid transitions in power level. Nevertheless, it will have a beneficial effect for a range of types of power level transition which might otherwise disturb sensitive optical elements downstream.

Figure 7:
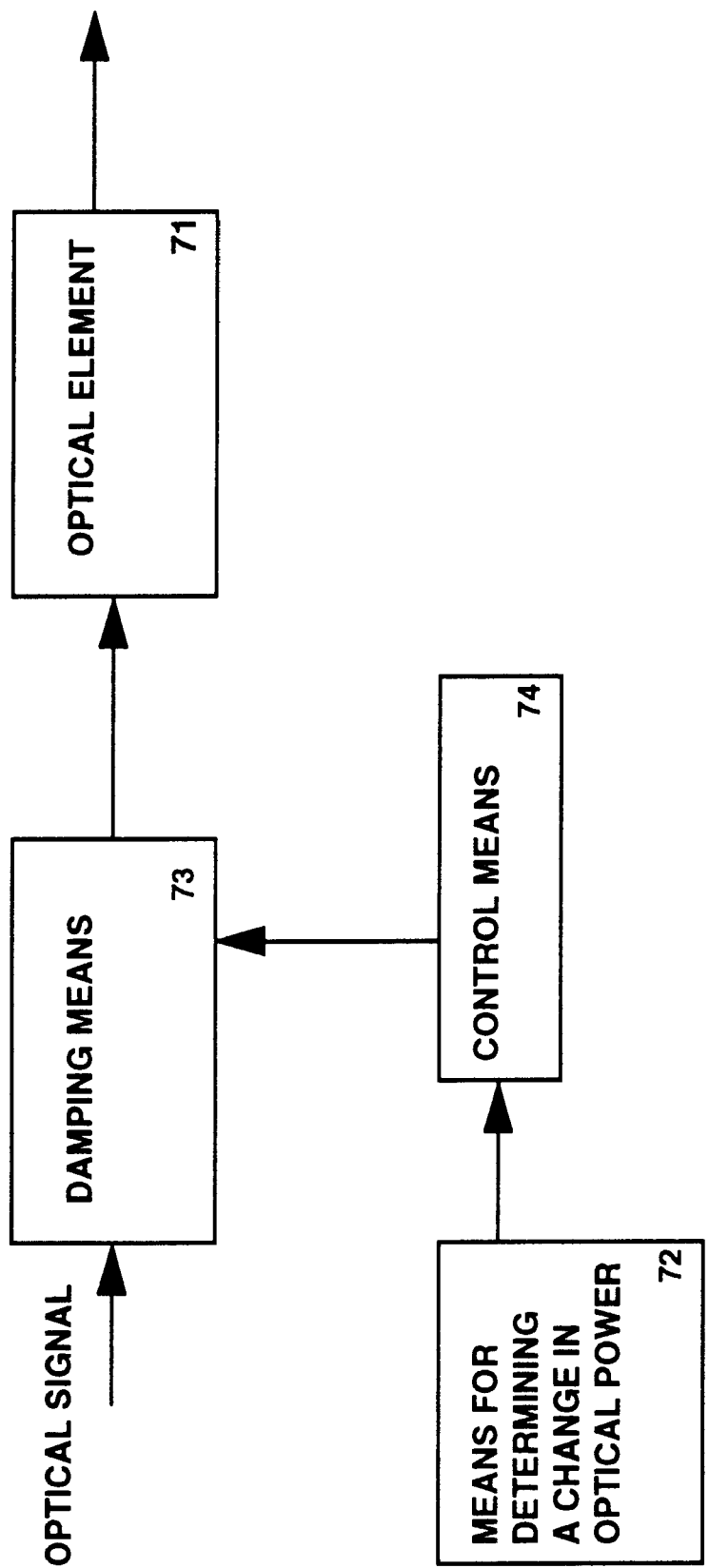
FIG. 7 shows another example of the invention in schematic form.

FIG. 7 shows in schematic form some of the features of the invention. A damping means 73 is provided in the optical path, leading to an optical element 71 which is sensitive to changes in the power of the optical signal. The damping means which may be incorporated in the transmitter as an alternative, or as well as being in the optical path, is controlled by a control means 74. The control means 74 is responsive to means for determining a change in the optical power, 72. The change can be determined by extrapolating from measurements of optical power or can be ascertained from instructions to change the power level, or from detecting alarms which indicate conditions which may lead to a change in power level.

In the embodiments described, where the optical element is an optical amplifier, the pump power of the optical amplifier may be controlled in response to the power measured in a subset of wavelength bands in the optical signal. If the subset is chosen to be those bands which are closest to upper and/or lower power thresholds, then the total power can be controlled with reduced power margins. This is described in some detail in another U.S. patent application by the same inventor, entitled "Power control for optical element" (Ser. No. 08/715,662), incorporated herein by reference.

Other variations within the scope of the claims will be apparent to a skilled man.

I claim:

1. A method of operating a multiplexed optical transmission system for transmitting a plurality of optical signals, and comprising an element sensitive to changes in optical power, the method comprising the steps of introducing a stabilising signal into the optical path upstream of the element; and controlling the power of the stabilising signal to compensate for changes in power levels of at least some of the other signals transmitted.

2. The method of claim 1 wherein the stabilising signal is used to carry information and has a greater tolerance to power transients than at least some of the other signals.

3. The method of claim 2 wherein the information is carried at a lower rate compared to at least some of the other signals.

4. The method of claim 2 wherein lower priority information is carried by the stabilising signal, compared to at least some of the other signals.

5. The method of claim 2 wherein the information includes more redundancy than that carried by at least some of the other signals.

* * * * *